Oct. 20, 1970 JAMES E. WEBB 3,535,702
ADMINISTRATOR OF THE NATIONAL AERONAUTICS
AND SPACE ADMINISTRATION
MAGNETIC COUNTER
Filed Sept. 19, 1967 3 Sheets-Sheet 1

INVENTOR.
RICHARD R. HAYDEN
BY
ATTORNEYS

INVENTOR.
RICHARD R. HAYDEN
BY
ATTORNEYS

INVENTOR.
RICHARD R. HAYDEN
BY
ATTORNEYS

United States Patent Office 3,535,702

Patented Oct. 20, 1970

3,535,702

MAGNETIC COUNTER

James E. Webb, Administrator of the National Aeronautics and Space Administration, with respect to an invention of Richard R. Hayden, Glendale, Calif.

Filed Sept. 19, 1967, Ser. No. 668,968
Int. Cl. G11c *11/08, 19/00;* H03k *23/10*
U.S. Cl. 340—174 8 Claims

ABSTRACT OF THE DISCLOSURE

An electronic counter circuit having many divider stages, each stage including a transfluxor which passes through four conditons of magnetization for every two transfer pulses received from the preceding stage, and each transfer pulse having positive and negative portions. Each stage also includes a transistor for generating transfer pulses for the next stage, the transistor being turned on when the transfluxor passes from a particular one of its four stages to the next.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to an electronic counting or divider type circuit utilizing magnetic cores.

Circuits for counting electric pulses are utilized in a large number of applications. In many such applications, circuits are desired which consume very little power between the receipt of counting pulses, in addition to having the usual desirable attributes of ruggedness, high reliability, and the like. For example, space probes for counting events which may occur at intervals of months generally require counters having low power consumption during the period when no counts are being registered. Counting circuits utilizing magnetic core devices are often used in such applications because magnetic cores retain a state without the consumption of power. However, such circuits often require numerous noncounting drivers and many components which contribute to complexity, cost, and unreliability.

SUMMARY OF INVENTION

The present invention provides a counting circuit generally having only one noncounting driver which has a constant, relatively small load regardless of counter length, which requires less power and lower voltages than counters available heretofore, and which has fewer components and simpler intromodual connections than counters available heretofore.

The counter circuit of this invention includes many divider stages connected in tandem, each delivering one transfer, or counting pulse for every two input pulses it receives. The counter also includes many storage stages, each coupled to one divider stage for registering each output pulse therefrom. A conductor connects each storage stage to the next preceding storage stage to ease or delete the count registered in the preceding storage stage which an output pulse is delivered from the succeeding divider stage. As a result, the storage stages register the pulses in the form of a binary number, each storage stage representing one binary digit. The first storage stage represents the least significant digit and the last stage represents the most significant digit.

Each divider stage of the counter includes a multi-aperture magnetic core, such as a two aperture core commonly referred to as a transfluxor. Each transfluxor includes, a first leg having a winding connected to the preceding counting stage, a second winding connecting to a transistor pulse generator of its stage for turning on the pulse generator, and a third winding which receives a current pulse that clears the transfluxor while a pulse is transmitted to the next succeeding stage.

The transfluxor of each divider stage passes through four states: the clear, set, prime, and read states. Each pulse from one stage to the first transfluxor winding in the succeeding stage has a positive pulse portion followed by a negaive pulse portion. With a transfluxor starting in the clear state, a pulse is received from the preceding divider stage, the positive portion of which has no effect, and the negative portion of which changes the transfluxor to the set state. The next pulse from the preceding stage has a positive portion which changes the transfluxor to the prime state and a negative portion which then changes the transfluxor to the read state. As the transfluxor switches from prime to read, a current is induced in the second winding which turns on the pulse amplifier of that stage. That pulse amplifier delivers a large pulse through the transfluxor which changes it back to the clear state, and simultaneously transmits a pulse (having positive and negative portions) to the transfluxor of the succeeding stage. Thus, one output pulse is delivered for every two input pulses to a stage.

The pulse amplifier of each divider stages includes a transistor normally in a cutoff or near cutoff state. The small pulse from the second transfluxor winding turns on the transistor to allow a large current pulse to flow therethrough and clear the transfluxor. This large current flows through one winding of a pulse transformer, and another winding of the transformer provides the pulse to the next counter stage. Unlike a normal blocking oscillator output which is damped to provide only a positive pulse portion, the winding leading to the next stage is constructed to have a large negative portion which is necessary for it to change the state of the next transfluxor.

A single first stage driver drives the first counter stage, and all succeeding counter stages are driven by the preceding stage, thereby providing for a simplified circuit.

The only connection required between adjacent divider stages is a pair of wires for transmitting the pulses to the succeeding transfluxor, and therefore, the interconnections are highly simplified. Each individual stage is also of great simplicity inasmuch as it requires only one transistor and six external connections. The circuit has very low dissipation between counts, on the order of microwatts of power, and the circuit is adaptable for reliable low power consumption applications for moderate maximum counting rates, on the order of 40 kc.

DESCRIPTION OF THE PREFERRED EMBODIMENTS

Figure 1:
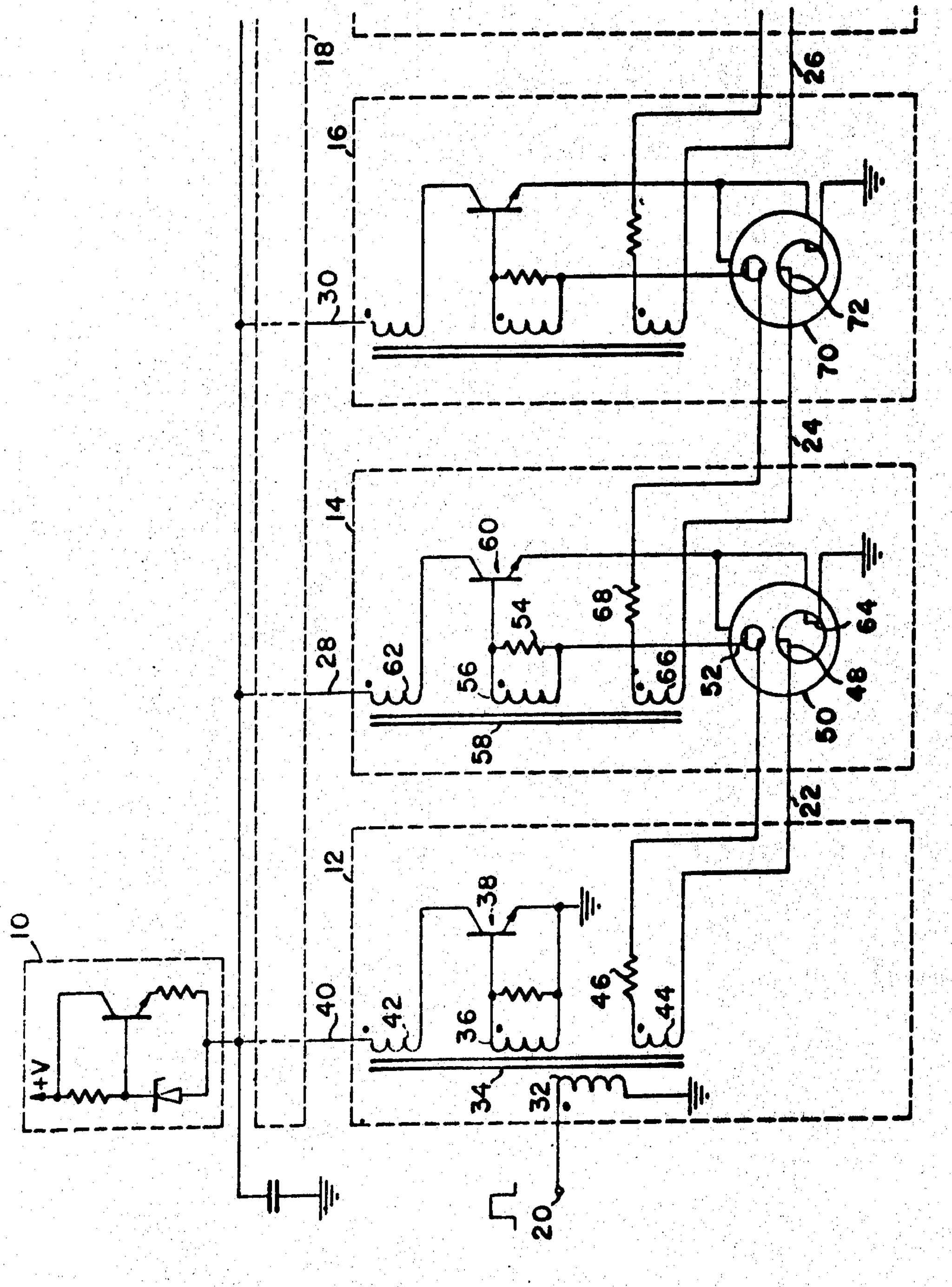
FIG 1 is a circuit diagram of an embodiment of the invention.

FIG. 1 is a schematic circuit diagram of a counter constructed in accordance with the invention and showing the first three counter stages thereof. The circuit comprises a constant current source or current regulator 10, and a first counter stage 12 which functions as a buffer and driver for receiving input pulses and delivering transfer pulses. The circuit also includes a second counter stage 14, third counter stage 16, and additional counter stages (not shown), all of which function as dividers, and each receiving transfer pulses from the preceding counter stage and delivering half as many transfer pulses to the succeeding stage. A storage memory 18 registers the count made by the counter stages.

Pulses to be counted are delivered to the counter circuit of the invention at input terminal 20, such pulses preferably having sharp rises for causing the registration of a count, with the rest of the pulse having no effect so long as it does not contain another portion with a sharp rise. The pulse input at 20 causes the first counter stage 12 to deliver a transfer pulse over transfer conductors 22 which lead to the second stage 14. The transfer pulses have substantial positive and negative portions and cause the second stage 14 to deliver transfer pulses over transfer conductors 24 to the third stage 16. The second stage 14 delivers only half as many transfer pulses at its output 24 as it receives at its input 22. The third stage 16 receives the transfer pulses at 24 and delivers half as many transfer pulses on transfer conductors 26. Additional counter stages (not shown) are provided which perform in a manner similar to the second and third stages 14 and 16.

The delivery of a transfer pulse by first counter stage 12 over its transfer conductors 22, occurs when the stage is receiving a storage pulse over storage line 40. The current to the storage line 40 passes through the storage memory 18 where a single count is registered. This count represents the least significant digit of a binary count of the storage memory. Similarly, each time the second stage 14 delivers a transfer pulse on its transfer conductors 24, it receives a storage pulse on its storage line 28, and that storage pulse also passes through the storage memory 18 to register a count in the second from least significant digit. The succeeding stages provide storage pulses to the memory 18 in a like manner. The memory 18 provides on command, and in a binary form, a count of the total number of pulses received by the counter, or divider circuit. Accordingly, the counter circuit receives input pulses at input terminal 20 and registers the total number of input pulses in the storage memory 18 where it can be readily read out as a binary number.

A better understanding of the invention can be had by considering the operation of various components of the circuit in registering input pulses. When a first pulse is delivered to the counter circuit at input terminal 20, the pulse is conducted through a first winding 32 of a pulse transformer 34. As a result of the rise of the input pulse at 20, a pulse is generated in a second winding 36 of the pulse transformer 32. The second pulse raises the base voltage of first stage transistor 38 and drives it towards saturation. As a result, transistor 38 conducts a large current pulse from source 10 through line 40, and through a third winding 42 of the pulse transformer 34. The large pulse through third winding 42 generates a large pulse in fourth winding 44 of the transformer. It may be noted that the relatively small input pulse at 20 which passes through first winding 32, generates a negligible pulse in fourth winding 44 as compared to that generated by the large current pulse flowing through third winding 42 when the transistor 38 is conducting.

Figure 2A:
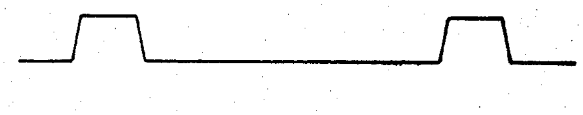
FIG. 2A is a waveform representation of storage pulses.
Figure 2B:
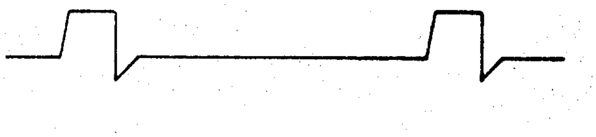
FIG. 2B is a waveform representation of transfer loop pulses.
Figure 2C:
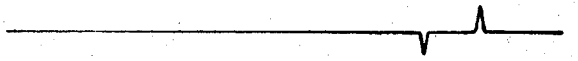
FIG. 2C is a waveform representation of transfluxor output pulses.
Figure 3A:
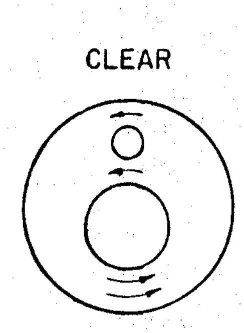
FIG. 3A is a representation of a transfluxor in a clear state.
Figure 3B:
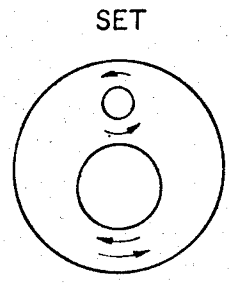
FIG. 3B is a representation of a transfluxor in a set state.

The fourth winding 44 is connected through a resistor 46 to transfer conductors 22 which leads to the second counter stage 14. The conductors 22 connect to transfer loop winding 48 which is wound about a minor leg of a transfluxor 50 of the second counter stage 14. The transfer conductors 22 are in a series circuit comprising the fourth winding 44 of the pulse transformer, the resistor 46 and the transfer loop winding 48. This series circuit provides a transfer pulse having an appreciable backswing, of the form shown in FIG. 2B. Before the pulse is passed through the transfer loop winding 48, the transfluxor 50 is in a "clear" state, with magnetizations as shown in FIG. 3A The positive portion of the pulse transmitted to the winding 48 has no effect on the transfluxor inasmuch as it magnetizes the minor leg about which it is wound, in the same direction in which the leg is already magnetized. The backswing, or negative portion of the pulse passing through transfer loop winding 48 changes the transfluxor to a "set" state with magnetizations as shown in FIG. 3B, but does not have any other effect on the circuit of the second counter stage 14.

Figure 3C:
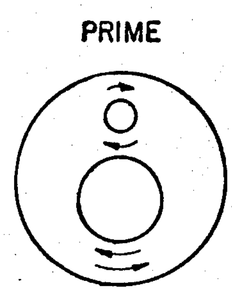
FIG. 3C is a representation of a transfluxor in a prime state.

With the transfluxor 50 in a set state, the next transfer pulse delivered by transfer conductors 22 to the transfer loop winding 48 has a more complex effect on the second counter stage 14. The second transfer pulse is, of course, the result of a second input to input terminal 20 of the complete counter. The positive portion of this second transfer pulse to the second counter stage, when passing through transfer loop winding 48, reverses the direction of magnetization in the transfluxor leg about which it is wound and places the transfluxor in a prime state with magnetizations as shown in FIG. 3C. This change of state from set to prime induces a voltage across a transfluxor output winding 52 which is wound around another minor leg of the transfluxor. However, the direction or polarity of the induced pulse is such as to result in no appreciable effect on the second counter stage 14.

Figure 3D:
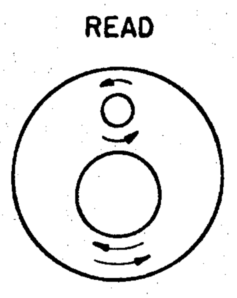
FIG. 3D is a representation of a transfluxor in a read state.

The backswing or negative portion of the second transfer pulse through transfer loop winding 48 has a major effect on the second counter stage. The backswing portion changes the transfluxor from a prime to a read state with magnetization as shown in FIG. 3D. The change from prime to read results in another pulse being induced in transfluxor output winding 52, in a direction opposite to the first pulse induced therein. This second pulse on output winding 52 passes through a resistor 54 and a second winding 56 of pulse transformer 58 of the second counter stage in a direction which increases the voltage at the base of transistor 60 of the second counter stage. The positive voltage at the base of the transistor 60 tends to drive it toward saturation and allows a collector current to flow therethrough. The collector current flows through storage line 28, which connects to the current source 10, through third winding 62 of the pulse transformer 58, through clear winding 64 which is wound about the major leg of the transfluxor, and then to ground.

The rise in current through third winding 62 further increases the pulse through second winding 56 to drive transistor 60 to full saturation so that a large pulse flows through third winding 62. The large pulse through third winding 62 induces a large pulse in first winding 66 of the pulse transformer 58. This pulse in first winding 66 passes through swamping resistor 68 to transfer conductors 24 which connect the second counter stage to the third counter stage 16.

The storage pulse passing through clear winding 64 switches the transfluxor 50 from its read state to a clear state with magnetizations as shown in FIG. 3A. Accordingly, after two transfer pulses are received over lines 22 by the second counter stage 14, the transfluxor 50 is again in its clear state, ready to receive another two transfer pulses which will cause it to pass through another complete cycle. Also, in passing through the complete cycle, the second counter stage 14 has generated one transfer pulse which it delivers over transfer conductors 24 to the third counter stage 16.

The third counter stage 16 has a transfluxor 70, with a transfer loop winding 72 wound about a minor leg of the transfluxor and connecting to the transfer conductors 24. The transfer pulses received over transfer conductors 24 have a positive and negative, or backswing, portion similar to the pulses transmitted by the counter 12 to the second counter stage 14 and having the waveform shown in FIG. 2B. The third counter stage 16 is constructed identically to the second counter stage 14, and the transfer pulse inputs thereto have the same effect as the transfer pulses received by the second counter stage. As a result, every two transfer pulses delivered over conductors 24 to the third counter stage 16 cause the transfluxor 70 therein to pass through a complete cycle of clear, set, prime, and read states, and then back to the clear state. As in the case of the second counter 14, the storage line 30 connecting the third counter stage 16 to the current source 10 carries a large storage pulse and the transfer conductors 26 carry a transfer pulse after every second transfer pulse delivered over conductors 24 to the third counter stage. As a result, the transfer conductors 26 carry a transfer pulse after every fourth input at 20 to the complete counter circuit.

The transfer conductors 26 of the third counter stage 16 connect to a fourth counter stage which is identical to the second and third counter stages, and the circuit has many additional counter stages for enabling a count of any desired maximum value to be made. For a number of stages, the maximum count is $2^n-1$; for example, a counter with 100 counter stages can count to 1023.

The count made by the counting circuit is defined by the counter stage to which the last storage pulse was delivered over its storage line. Each of the counter stages has a weight equal to 2 raised to a power equal to the position of that counter stage (with the first stage being $2^\circ$ or 1). For example, the first storage pulse through storage line 40 to the first stage 12 represents a count of 1, the first storage pulse over line 28 to second counter stage 14 represents a count of 2, the first pulse over storage line 30 to the third counter stage 16 represents a count of 4, and so on. The storage memory 18 serves to register a count which depends upon the storage line therethrough which last carried a pulse.

Figure 5:
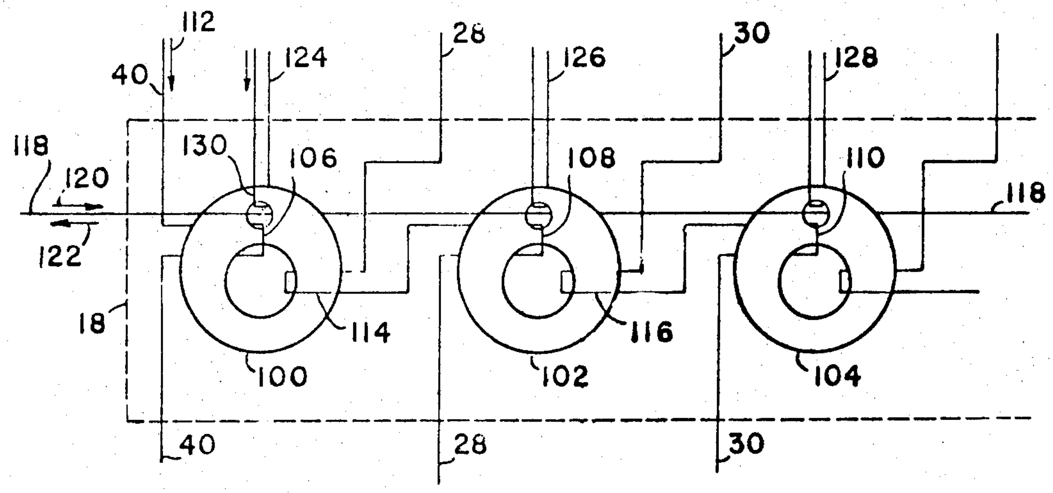
FIG. 5 is a diagram of a transfluxor storage memory for use in the counter circuits of FIGS. 1 and 4.

One embodiment of the storage memory 18 is shown in FIG. 5, wherein transfluxors 100, 102, and 104 are shown, it being understood that the storage memory has as many transfluxors as there are counter stages in the counter circuit. Each storage line such as lines 40, 28, and 30, which connect to the first, second, and third counter stages of the circuit of FIG. 1, connect to register loops 106, 108, and 110, which are wound about the center leg of the transfluxor with which they are associated. An understanding of the operation of the storage memory can be obtained by first assuming that the count is zero, and all of the transfluxors 100, 102, 104, etc. are in a clear state with magnetizations as shown in FIG. 3A. When a first storage pulse is delivered through storage line 40, in the direction of arrow 112, the center leg about which the register loop 106 is wound has a change of magnetization and the transfluxor 100 is changed to its set state with magnetizations as shown in FIG. 3B. The second pulse to be counted by the entire counting circuit results in there first being another transfer pulse over storage line 40, which has no effect on transfluxor 100, and a storage pulse being carried over storage line 28 which leads to the second counter stage 14 of the counter circuit.

The storage pulse through storage line 28 passes through a clear loop 114 wound upon the major leg of the transfluxor 100 and through register winding 108 which is wound upon the center leg of transfluxor 102. The pulse through clear loop 114 changes transfluxor 100 from a set state back to a clear state with magnetizations shown in FIG. 3A. The storage pulse through register loop 108 changes the transfluxor 102 from a clear to a set state. Thus, the second pulse input to the counter circuit results in all transfluxors being in a clear state except for transfluxor 102 which is in a set state.

The next pulse input to the counter results in a storage pulse through storage line 40 which changes transfluxor 100 to a set state. We can consider the transfluxor states as representing binary digits, with a clear state representing zero and a set state representing 1, and with the least significant digit represented by transfluxor 100 and succeeding significant digits represents by succeeding transfluxors to the right. Then it can be appreciated how the row of transfluxors can represent numbers. The first count resulted in only transfluxor 100 being in a set state to represent the binary number "001" which is a 1, while the second pulse resulted in transfluxor 100 reverting back to a clear state while transfluxor 102 was set to represent "010" which is a 2. The third pulse input resulted in both transfluxors 100 and 102 being set to represent the binary number "011" which is a 3.

Continuing with the above description of the counting processes in the storage memory, the fourth pulse input to the counter results in there first being a pulse through line 40, then through line 28, and then through storage line 30. The pulse through line 40 has no effect on transfluxor 100. The pulse through line 28 clears transfluxor 100 and has no effect on the set state of transfluxor 102. The last pulse, through line 30, passes through clear loop 116 to change transfluxor 102 to a clear state and passes through register loop 110 of transfluxor 104 to change transfluxor 104 to a set state. Accordingly, the fourth pulse results in only transfluxor 104 being in a set state, and it represents the binary digit of weight four. A similar process occurs for succeeding transfluxors of the storage memory.

The storage memory 18 can be interrogated at any time to determine the count registered therein, by interrogating each of the transfluxors 100, 102, 104, etc. This can be done by transmitting a prime pulse in the direction of arrow 120 through prime line 118 which threads all of the small holes of all of the transfluxors 100, 102, 104, etc. of the storage memory. The prime pulse through prime line 118 tends to place each transfluxor in a prime state with magnetizations as shown in FIG. 3C. Each of the transfluxors which is in a set state is changed to a prime state. However, each of the transfluxors which is in a clear state is not changed because the prime pulse through the prime line 118 is not sufficiently large to cause a change from the clear to the prime state; this is because such a change requires a change in the magnetization of the major leg, which can usually be accomplished only with a very large pulse, and usually only with a pulse sent through a loop wound about the major leg of the transfluxor. After a prime pulse is sent through prime line 118, a read pulse is sent through line 118, a read pulse being a pulse in the opposite direction, that is, in the direction of arrow 122. The read pulse tends to change all transfluxors from a prime state to a read state with magnetization as shown in FIG. 3D. As in the case of the prime pulse, those transfluxors in a clear state are unaffected while those transfluxors in a prime state are changed back to the read state, which is the same as the set state.

In changing back from the prime to the read or set state, the magnetization in the outer minor leg such as leg 130, is reversed. An interrogation loop 124 wound about the leg 130 thereupon receives a pulse due to the change in magnetization of the leg upon which it is wound, if such a change occurs. The existance of such a pulse indicates that the transfluxor 100 was changed from prime back to set, and therefore indicates that transfluxor 100 was originally in a set state rather than a clear state. Other interrogation loops such as loop 126 wound upon transfluxor 102 and loop 128 wound upon transfluxor 104 may deliver pulses at the same time as any interrogation pulse delivered through interrogation loop 124, to indicate the state of their respective transfluxors.

Figure 4:
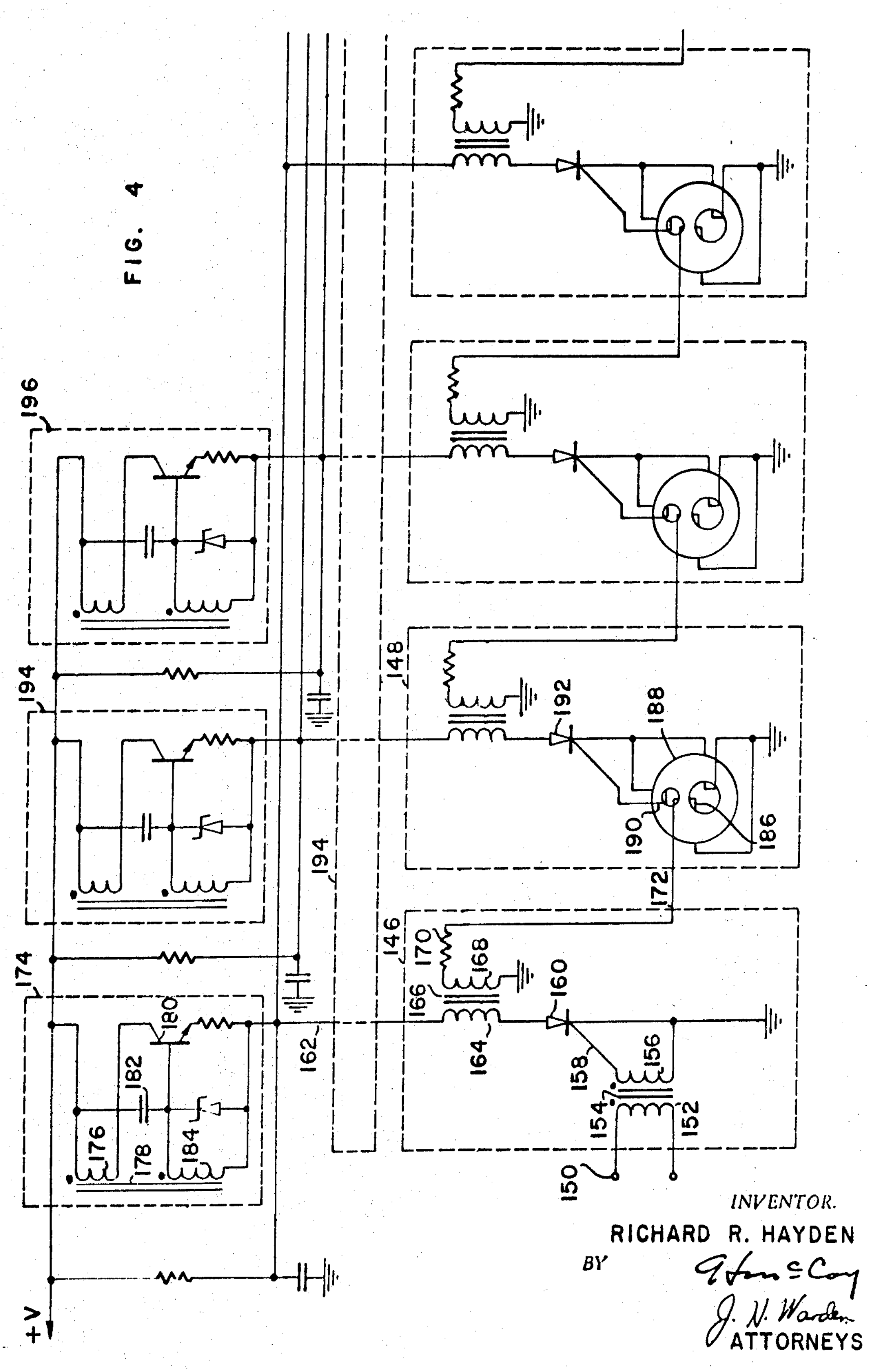
FIG. 4 is a circuit diagram of another embodiment of a counter constructed in accordance with the invention.

Another embodiment of the invention shown in FIG. 4 utilizes silicon controlled rectifier elements in place of a transistor regeneration circuit for each counting stage. The use of the silicon controlled rectifiers increases the upper frequency limit of counting over that provided by typical blocking oscillator embodiments of the type shown in FIG. 1, as from a 20 kc. to a 40 kc. counting rate. In the circuit of FIG. 4, input pulses are received at input 150, and they pass through first winding 152 of a transformer 154. Positive pulses at input 150 induce pulses in second winding 156 which enter gate 158 of silicon controlled rectifier (SCR) 160. The positive pulse turns on the SCR so that currents can flow through it from voltage source +V through first stage storage line 162, and eventually to ground. The large pulse through the SCR passes through first winding 164 of pulse transformer 166, and causes a pulse to be induced in second winding 168 of the transformer. The second winding passes through swamping resistor 170 to transfer conductor 172 at the output of the first counter stage 146.

The SCR 160 has the characteristic that, once turned on, it continues to conduct until the voltage between its anode and cathode drops to a low level. Accordingly, a first driver 174 is provided to enable a large pulse to flow through the SCR 160 when it is first turned on and to automatically cut off the pulse after a brief period, thereby turning off the SCR until a next counting pulse is received. The first driver 174 has a transistor 180 connected in a regenerative manner so that it conducts a large current pulse when SCR 160 is turned on, but this pulse is quickly reduced to a negligible level. When the SCR 160 is first turned on by the pulse to its gate 158, a small current pulse passes from the source +V through capacitor 182, first winding 184 of a transformer 178, and then to the storage line 162. This pulse raises the base voltage of transistor 180, thereby reducing its collector to emitter resistance. As a result, a large current flows through the transistor, and this current flowing through second winding 176 of the transformer 178 induces a current in first winding 184 which further raises the base voltage and drives transistor 180 towards saturation. This building up of the collector current through the transistor allows a large storage pulse to flow through line 162 and through SCR 160. After the pulse reaches a maximum level, the base voltage at transistor 180 degenerates, the transistor is turned off, and the storage pulse to line 162 is reduced to a low level, thereby turning off SCR 160.

The transfer conductor output 172 of the first counter stage connects to transfer loop 186 of a transfluxor 188 of the second counter stage 148. The impedance of the circuit which includes the second transformed winding 168, swamping resistor 170, and transfer loop winding 186 is such that significant negative as well as positive pulse portions are included in each pulse. The transfluxor 188 of the second stage passes through the clear, set, prime, and read cycles in the same manner as the transfluxors of the circuit of FIG. 1. Also, in a similar manner, the change from prime to read results in a pulse through a transfluxor output winding 190 which fires an SCR 192 of the second stage to cause a storage pulse to be generated in the second counter stage for every 2 pulses generated by the first counter stage. The storage memory 194 is similar to the storage memory 18 of the circuit in FIG. 1.

The circuit of FIG. 4 utilizes three drivers or current regulators 174, 196, and 198. When one SCR of the circuit has been turned off and the voltage across it is zero, the SCR in the next counter stage may be firing and require a voltage. To accommodate this phasing two or three drivers are required for each counter.

The counter circuits above provide a relatively simple counter for registering electric pulses, and provide several important advantages over previously available counters. The counter can operate from relatively low voltage, and inbetween counting pulses the circuit consumes very little power, the amount being on the order of microwatts. The construction is very simple, utilizing only one transistor per stage, and requiring, in the case of the circuit of FIG. 1, only six external connections for each counter stage.

While particular embodiments of the invention have been illustrated and described, it should be understood that many modifications and variations may be resorted to by those skilled in the art, and the scope of the invention is limited only by a just interpretation of the following claims.

What is claimed:

1. A multistage counter circuit comprising:

a plurality of stages, each having
- a transfer input;
- a transfer output;
- magnetic core means for establishing a plurality of states of magnetization;
- transfer winding means coupling said transfer input to said magnetic core means for changing the magnetization of said magnetic core means from a first state to a second, from said second state to a third, and from said third state to a fourth upon the receipt of successive transfer pulses, each having positive and negative portions, the change from said third to said fourth state including a reversal in direction of magnetic flux in a predetermined portion of said magnetic core means;
- output winding means coupled to said predetermined portion of said magnetic core means for generating a predetermined output pulse upon the change of said magnetic core means from said third state to said fourth state;
- clear winding means coupled to said magnetic core means for changing the magnetization thereof from said fourth to said first state; and
- pulse means responsive to said predetermined output pulse in said output winding means and connected to said clear winding means, for delivering a clear pulse to said clear winding means; and
- means connecting the transfer output of one of said plurality of stages to the transfer input of another of said plurality of stages.

2. A counter circuit as defined in claim 1 wherein:

said magnetic core means comprises a first leg and a second leg, and a third leg having a flux capacity and resistance to magnetization which is greater than that of either of said first and second legs;

said transfer winding means is disposed about said first leg, said output winding means is disposed about said second leg, and said clear winding means is disposed about said third leg;

said first magnetic core means state is a clear state wherein said third leg is magnetically saturated in a first direction; and the direction of magnetization in said second leg is in a first direction during said first, second and fourth magnetic core means states and is in an opposite direction during said third state.

3. A counter circuit as defined in claim 1 wherein said pulse means in each of said plurality of counter stages comprises:

transistor means having a base;

means connecting the base of said transistor means to said output winding means for turning on said transistor means when said predetermined output pulse is generated in said output winding means;

means connecting the output of said transistor to said clear winding means for carrying a large current pulse therethrough when said transistor means is turned on; and transfer means connecting the output of said transistor means to said transfer output of said stage, said transfer means having an impedance characteristic for carrying a pulse having significant positive and significant negative portions.

4. A counter circuit as defined in claim 1 wherein said pulse generating means comprises:

a transistor having a base and emitter connected to said output winding means;

transformer means having a first winding connected to the output of said transistor, a second winding connected to said base of said transistor for driving said transistor towards saturation when a current pulse flows through said first winding, and a third winding;

conductor means connecting the output of said transistor to said clear winding means for carrying a pulse therethrough when said transistor is driven toward saturation; and connecting means connecting said third transformer winding to said transfer output of said stage, said connecting means, said third transformer winding, and the transfer winding means of the next succeeding counter stage being constructed for carrying pulses having both a positive portion and a negative portion.

5. A counter circuit as defined in claim 1 wherein:

said pulse means comprises a silicon controlled rectifier means having a gate connected to said output winding means; and including means connecting said clear winding means to the main circuit of said silicon controlled rectifier means;

means connected to said silicon controlled rectifier means for extinguishing it immediately after it is turned on; and means connecting said transfer output of said counter stage to the main circuit of said silicon controlled rectifier means.

6. A counting circuit constructed of a multiplicity of counter stages, a particular one of said stages comprising:

a transfer input;

a transfer output;

a transfluxor means with first and second minor paths and a major path;

a transfer loop winding connected to said transfer input and wound upon said first minor path;

a transfluxor output winding wound upon said second minor path;

a clear winding wound upon said major path; and drive means responsive to pulses in said transfluxor output winding connected to said clear winding and said transfer output, for delivering a pulse to said clear winding and a pulse having substantial positive and negative portions to said transfer output when an output pulse in a predetermined direction is generated in said transfluxor output winding.

7. A counter circuit as defined in claim 6 wherein said drive means comprises:

a transistor;

a pulse transformer having first, second and third transformer windings;

means connecting said first transformer winding to said collector of said transistor;

means connecting said emitter of said transistor to said clear winding;

means connecting said second transformer winding between said base of said transistor and one side of said transfluxor output winding;

means connecting the other side of said transfluxor output winding to said emitter of said transistor; and means connecting said third transformer winding to said transfer output.

8. A counter circuit as defined in claim 6 including:

a next preceding counter stage having a drive means for generating pulses and a transfer output connecting said drive means of said next preceding counter stage to said transfer input of said particular of said counter stages;

storage means connected to said drive means of said next preceding and said particular counter stages for registering pulses delivered by said drive means of said stages, said storage means including a first storage transfluxor means associated with said particular counter stage and a second storage transfluxor means associated with said next preceding counter stage, and each of said storage transfluxor means having a major leg and a minor leg;

a major leg windings disposed about each of said major legs and a minor leg windings disposed about each of said minor legs; and means connecting said driver of said particular stage to the minor leg winding of the storage transfluxor associated with said particular counter stage and means connecting the driver of said particular stage to said major leg winding of the storage transfluxor of said next preceding counter stage.

References Cited

UNITED STATES PATENTS

| | | | |
|---|---|---|---|
| 3,063,038 | 11/1962 | Davis et al. | 340—174 |
| 3,096,509 | 7/1963 | Rosenberg et al. | 340—174 |
| 3,117,308 | 1/1964 | Sublette | 340—174 |
| 3,217,178 | 11/1965 | Burns | 307—88.5 |

JAMES W. MOFFITT, Primary Examiner

U.S. Cl. X.R.

307—224, 225, 282, 284